United States Patent
Matar et al.

(10) Patent No.: US 12,306,909 B1
(45) Date of Patent: May 20, 2025

(54) TIMES SERIES MODEL EXPLAINABILITY

(71) Applicant: Anaplan, Inc., San Francisco, CA (US)

(72) Inventors: Oren Matar, Ramat Gan (IL); Maya Bercovitch, Neve Yamin (FI)

(73) Assignee: Anaplan, Inc., San Francisco, CA (US)

( * ) Notice: Subject to any disclaimer, the term of this patent is extended or adjusted under 35 U.S.C. 154(b) by 955 days.

(21) Appl. No.: 17/397,384

(22) Filed: Aug. 9, 2021

(51) Int. Cl.
*G06N 20/00* (2019.01)
*G06F 18/20* (2023.01)
*G06F 18/21* (2023.01)
*G06F 18/211* (2023.01)

(52) U.S. Cl.
CPC ........... *G06F 18/29* (2023.01); *G06F 18/211* (2023.01); *G06F 18/2163* (2023.01); *G06N 20/00* (2019.01)

(58) Field of Classification Search
CPC ....................................................... G06F 18/29
USPC .......................................................... 706/12
See application file for complete search history.

(56) References Cited

U.S. PATENT DOCUMENTS

| | | | |
|---|---|---|---|
| 2017/0053552 A1* | 2/2017 | Zhong | A61B 5/7405 |
| 2018/0211182 A1* | 7/2018 | Lei | G06V 10/7715 |
| 2020/0211325 A1* | 7/2020 | Kaizerman | G06F 16/2477 |
| 2021/0245201 A1* | 8/2021 | Toledano | G05B 19/406 |
| 2022/0028563 A1* | 1/2022 | Klasson | H04L 51/222 |
| 2022/0198254 A1* | 6/2022 | Dalli | G06N 5/025 |
| 2022/0374105 A1* | 11/2022 | Seth | G06F 3/04842 |

* cited by examiner

*Primary Examiner* — Ruay Ho
(74) *Attorney, Agent, or Firm* — Chamberlain, Hrdlicka, White, Williams & Aughtry; Aly Z. Dossa

(57) ABSTRACT

A method for a time series forecaster including a machine learning (ML) model and a time series forecasting algorithm may be used to generate a future forecast model for a time series dataset. The future forecast model includes a future prediction showing a future forecast of the time series dataset. Rather than simply presenting the importance of a forecasting model feature in a limited manner, such as in the form of a number (e.g., a float number), the future forecast model of one or more embodiments may advantageously include at least one forecasting model feature visualization output that visually illustrates the effects of one or more forecasting model features on the future prediction.

17 Claims, 13 Drawing Sheets

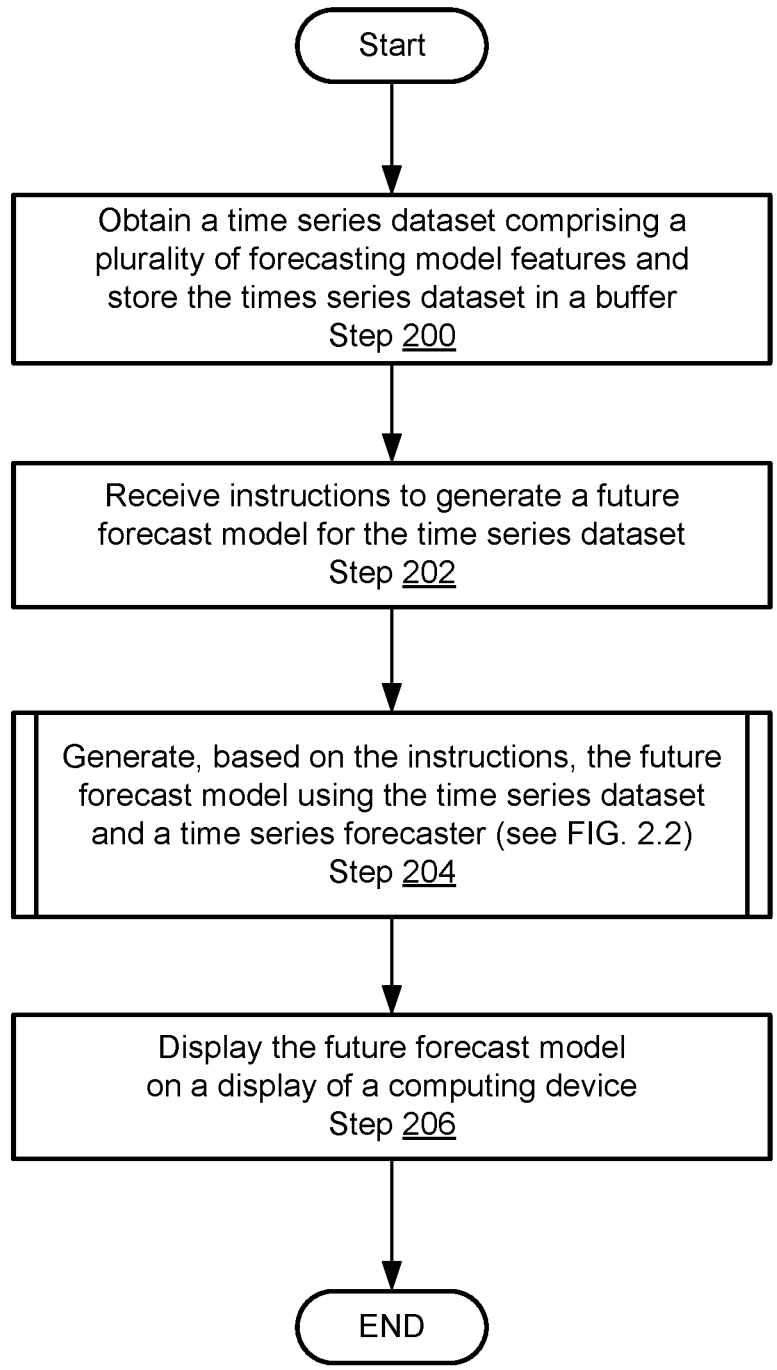
FIG. 2.1

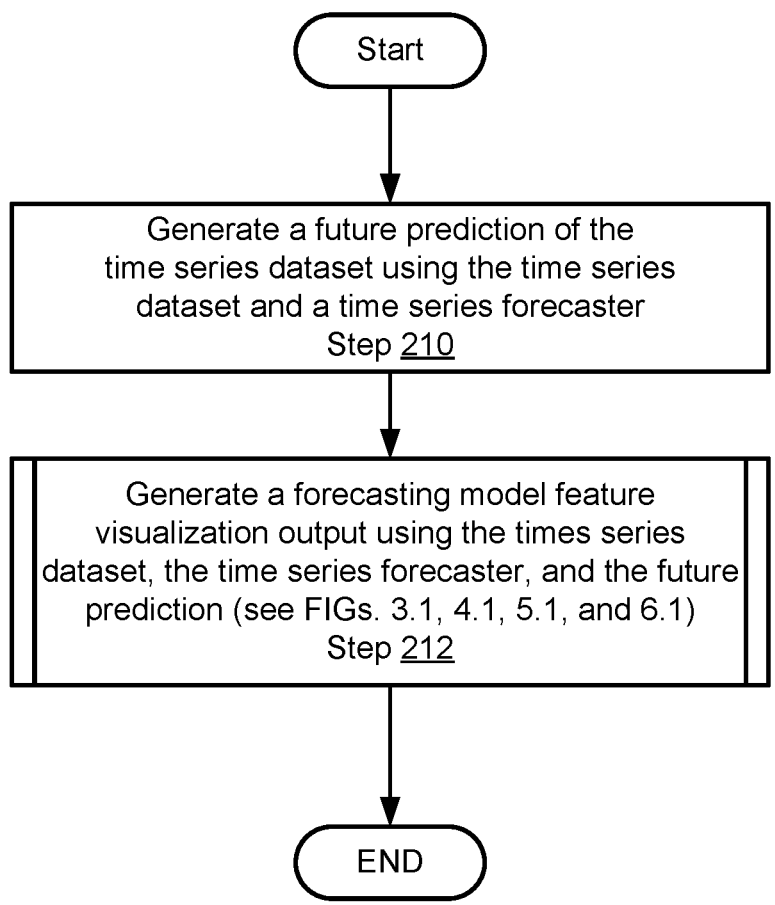
FIG. 2.2

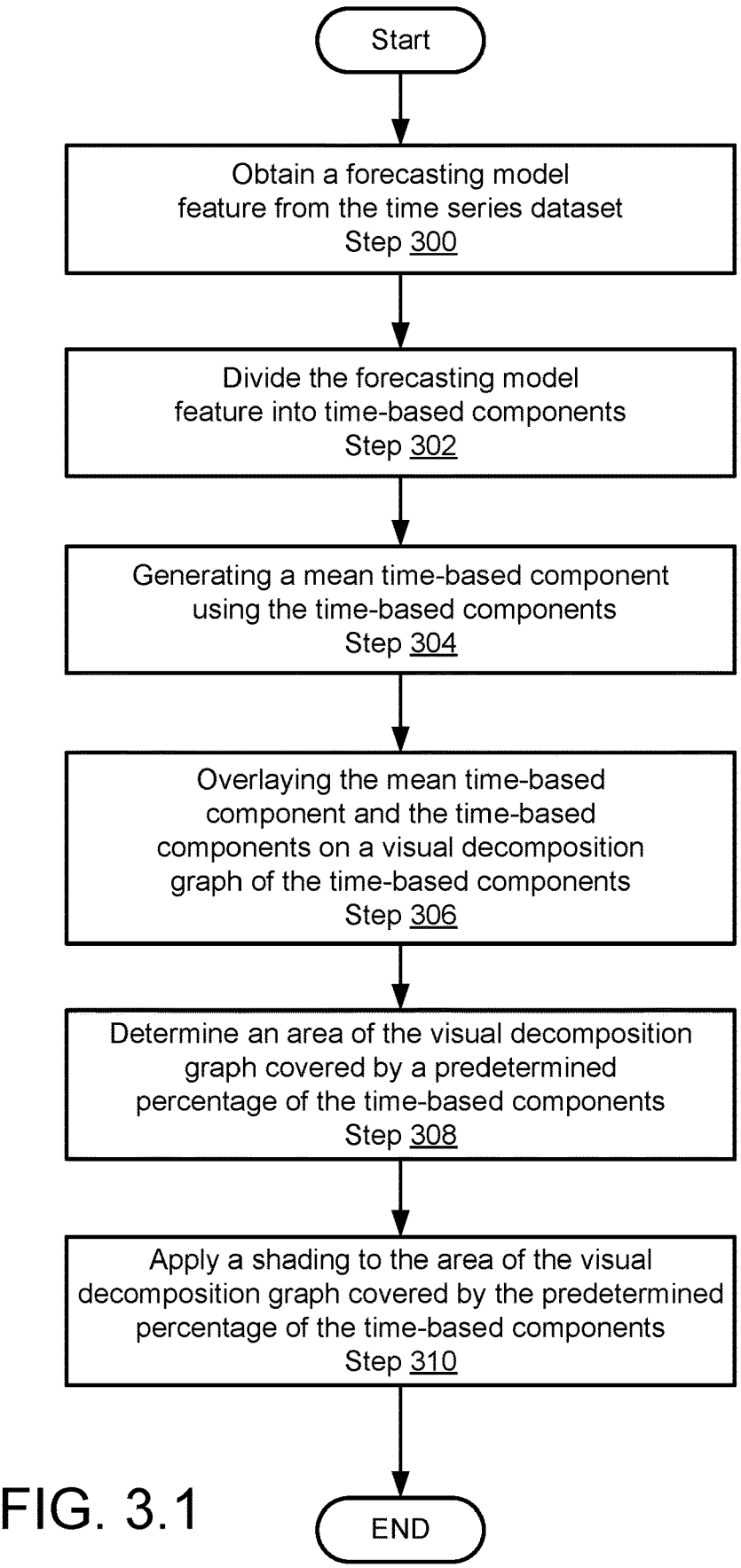
FIG. 3.1

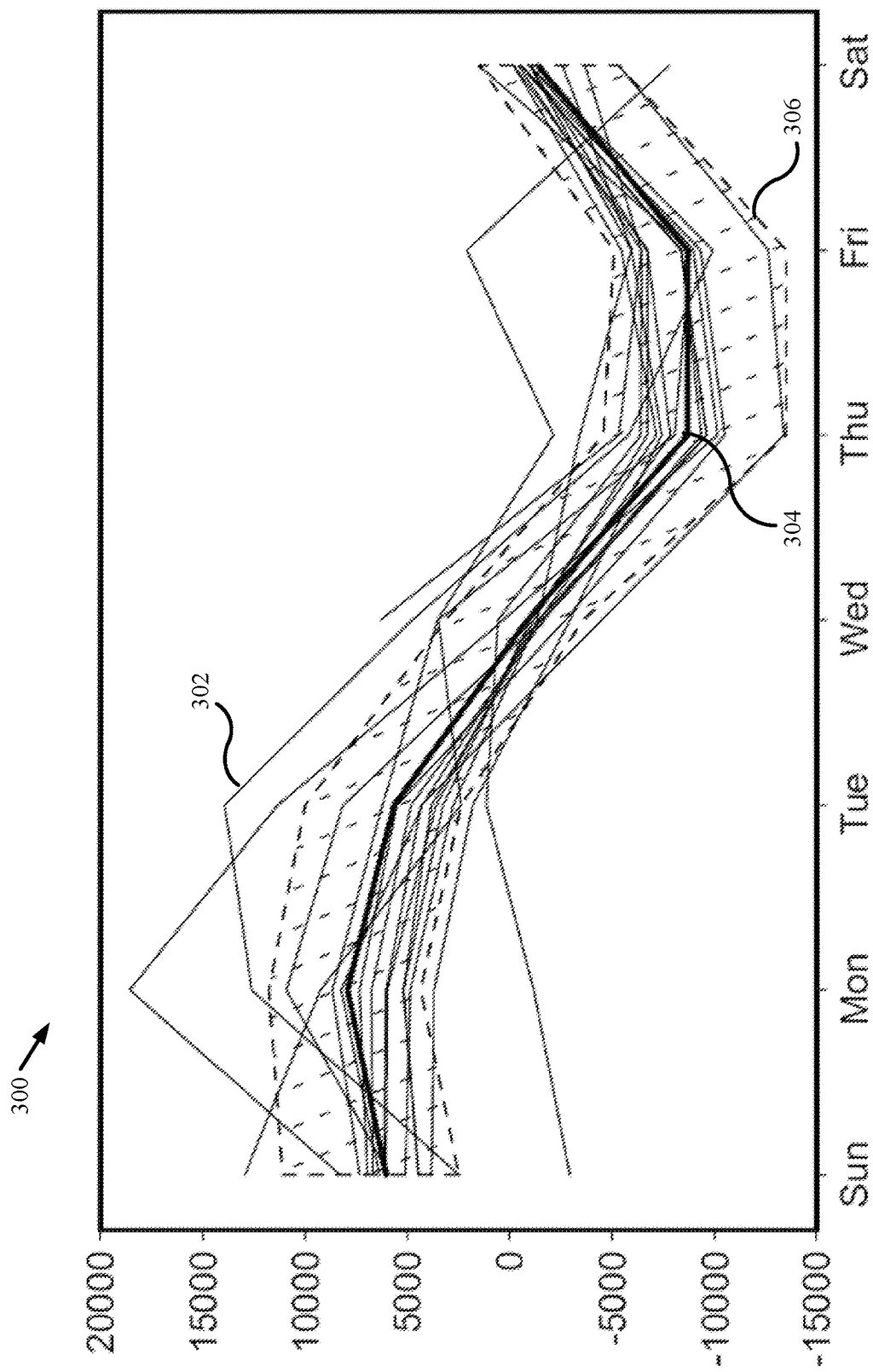
FIG. 3.2

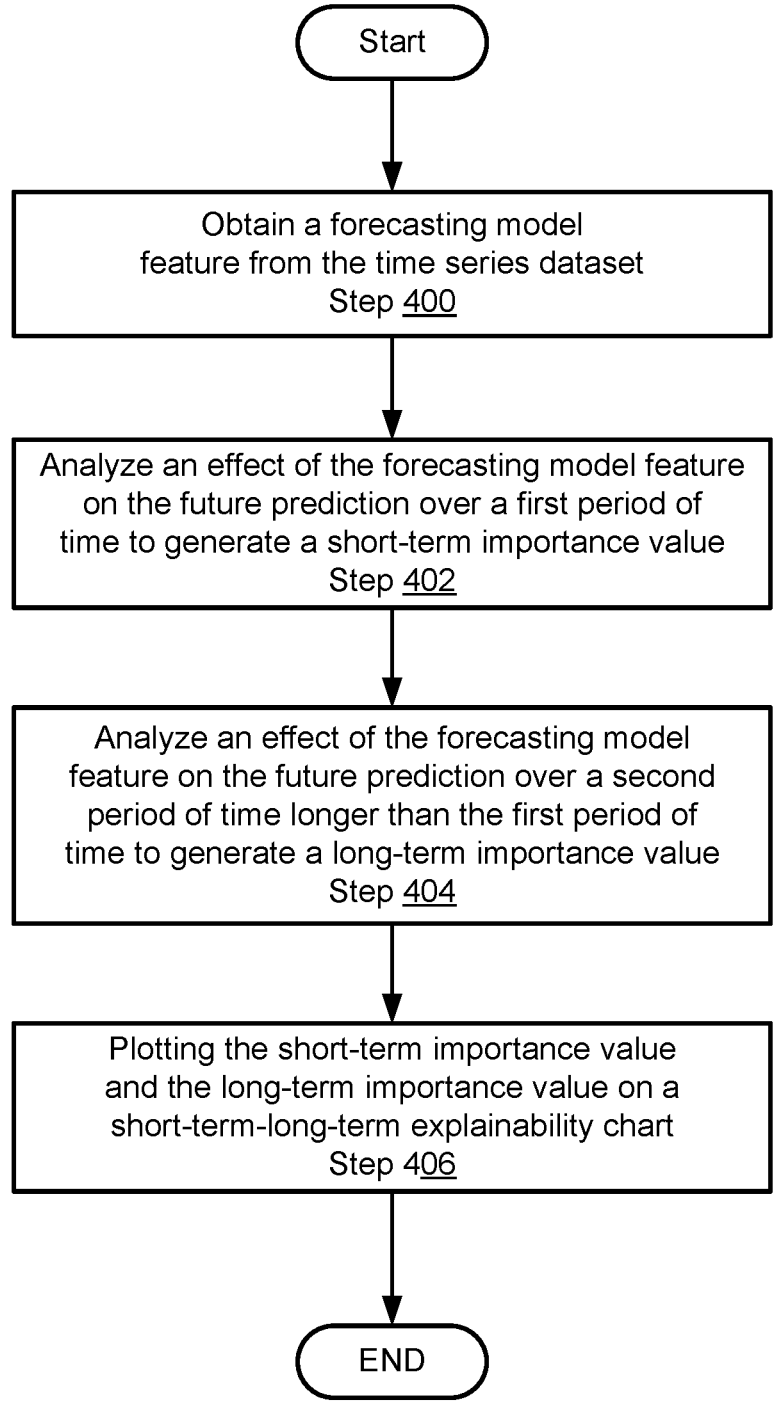
FIG. 4.1

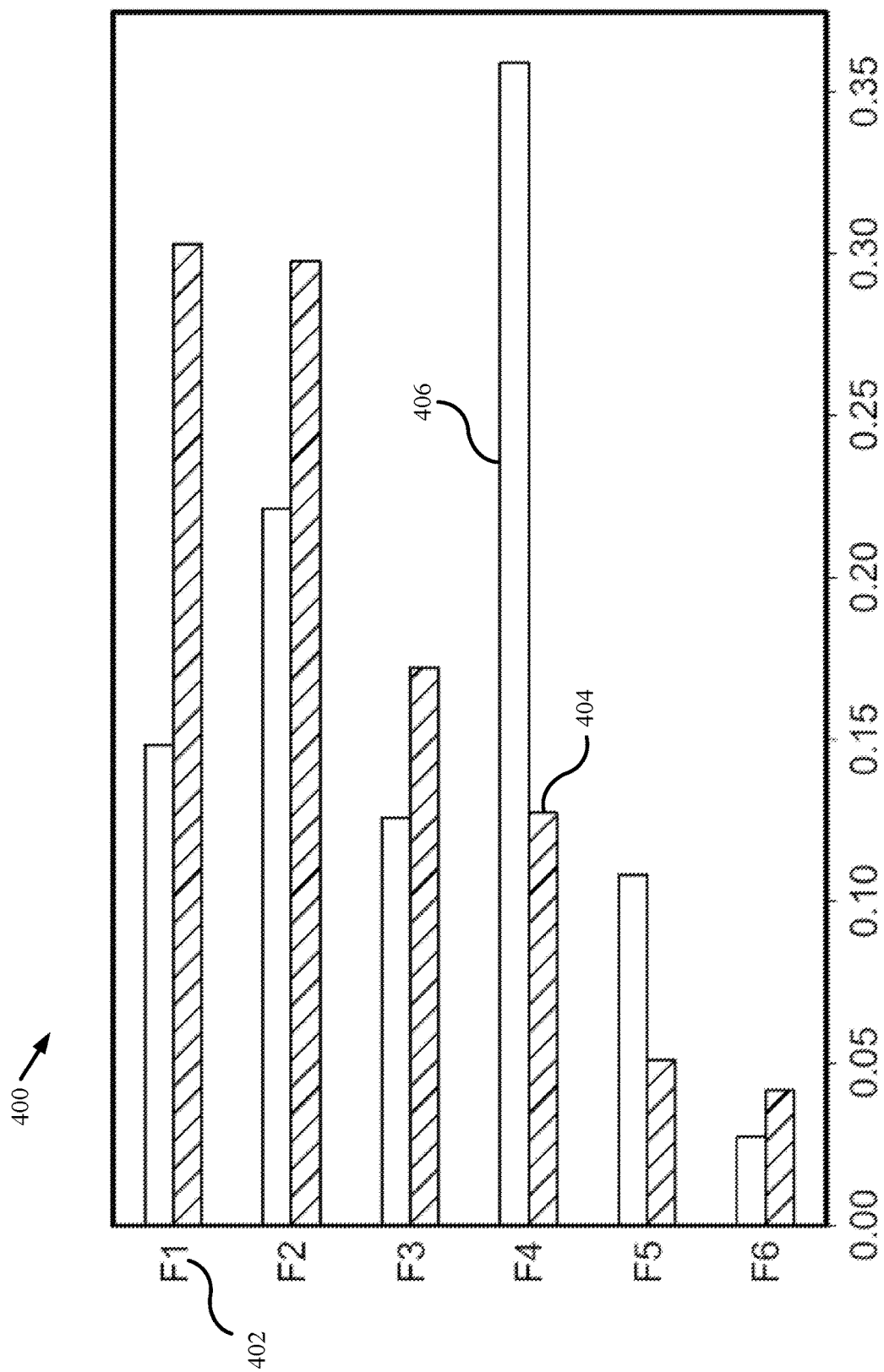
FIG. 4.2

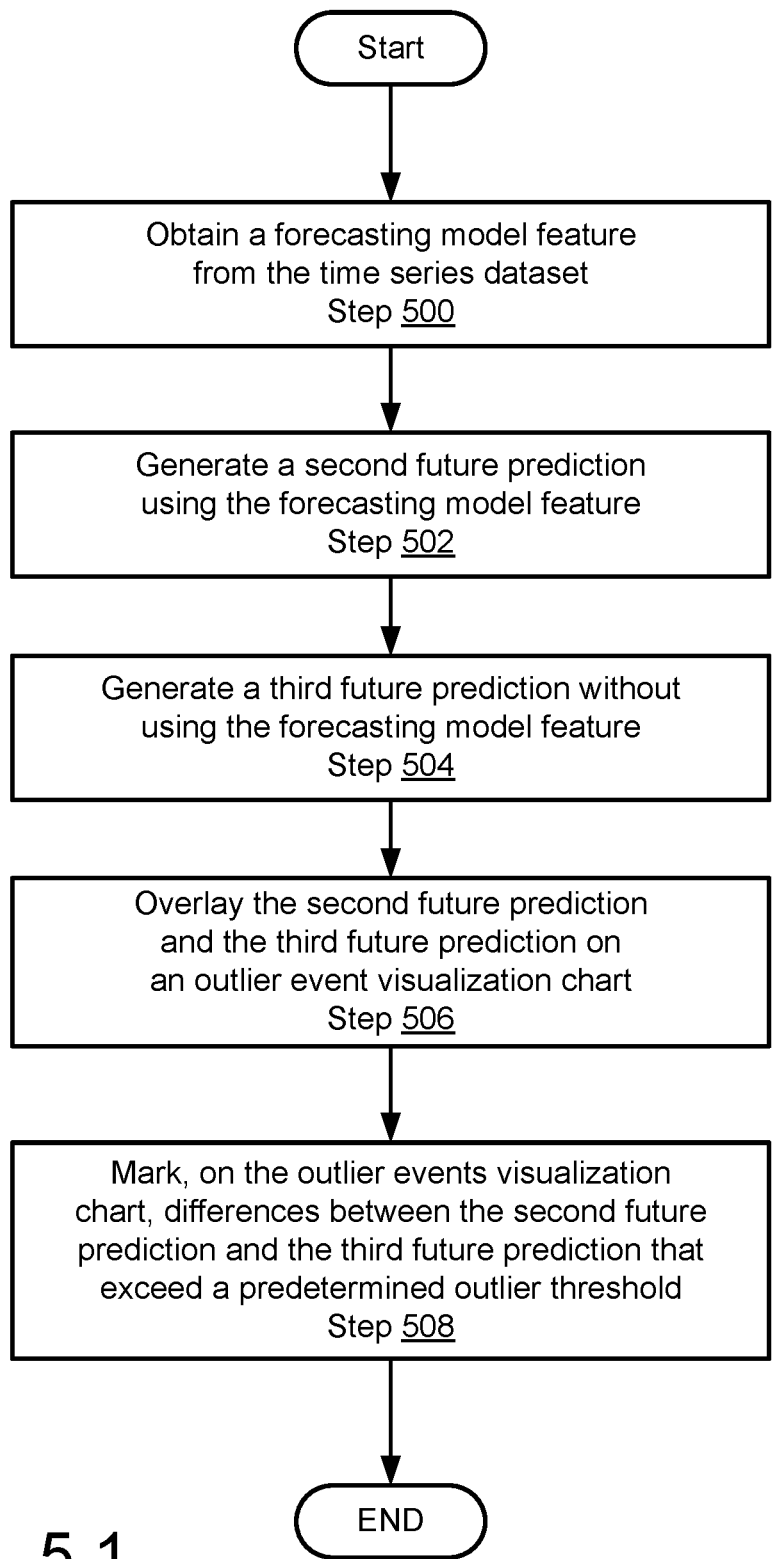
FIG. 5.1

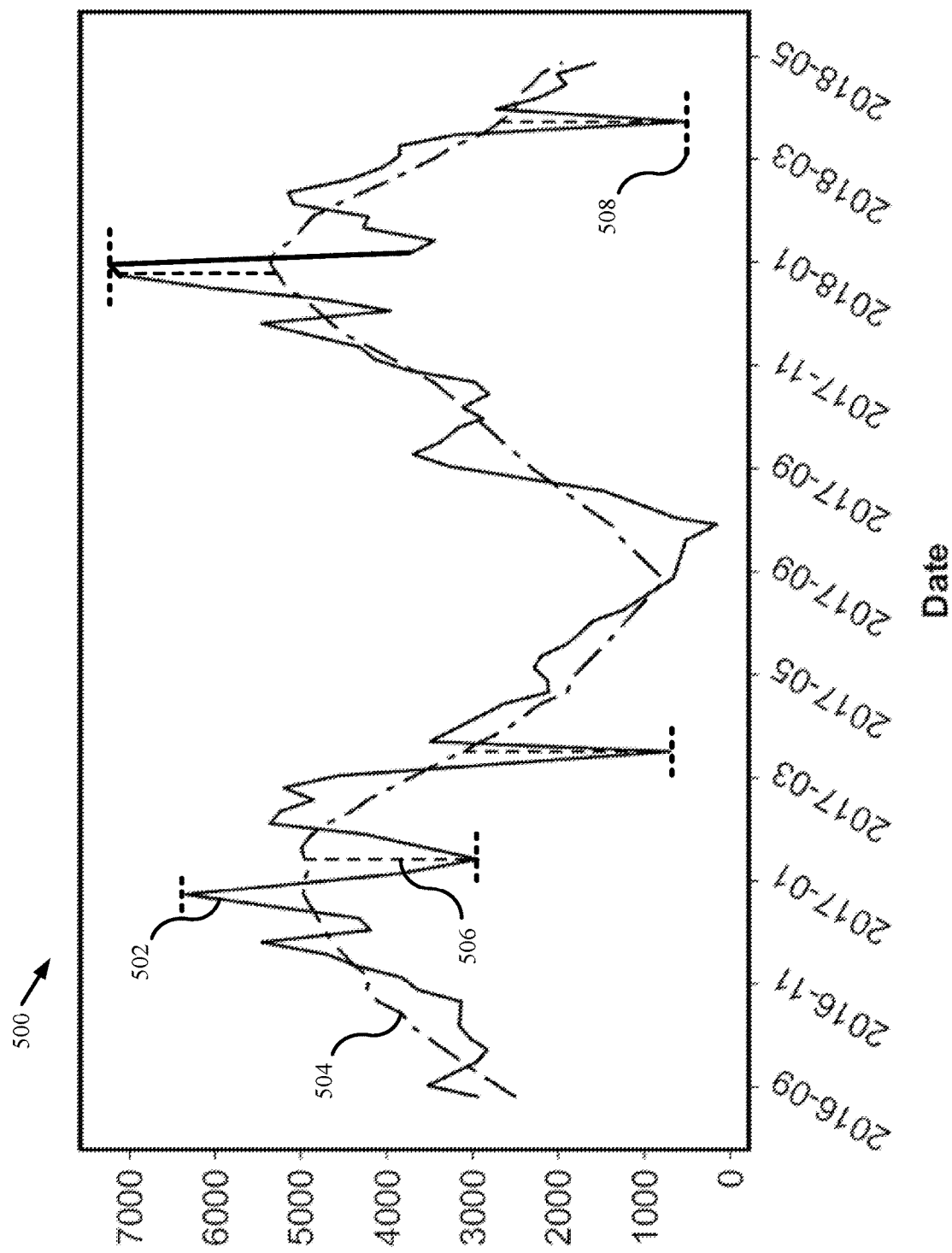
FIG. 5.2

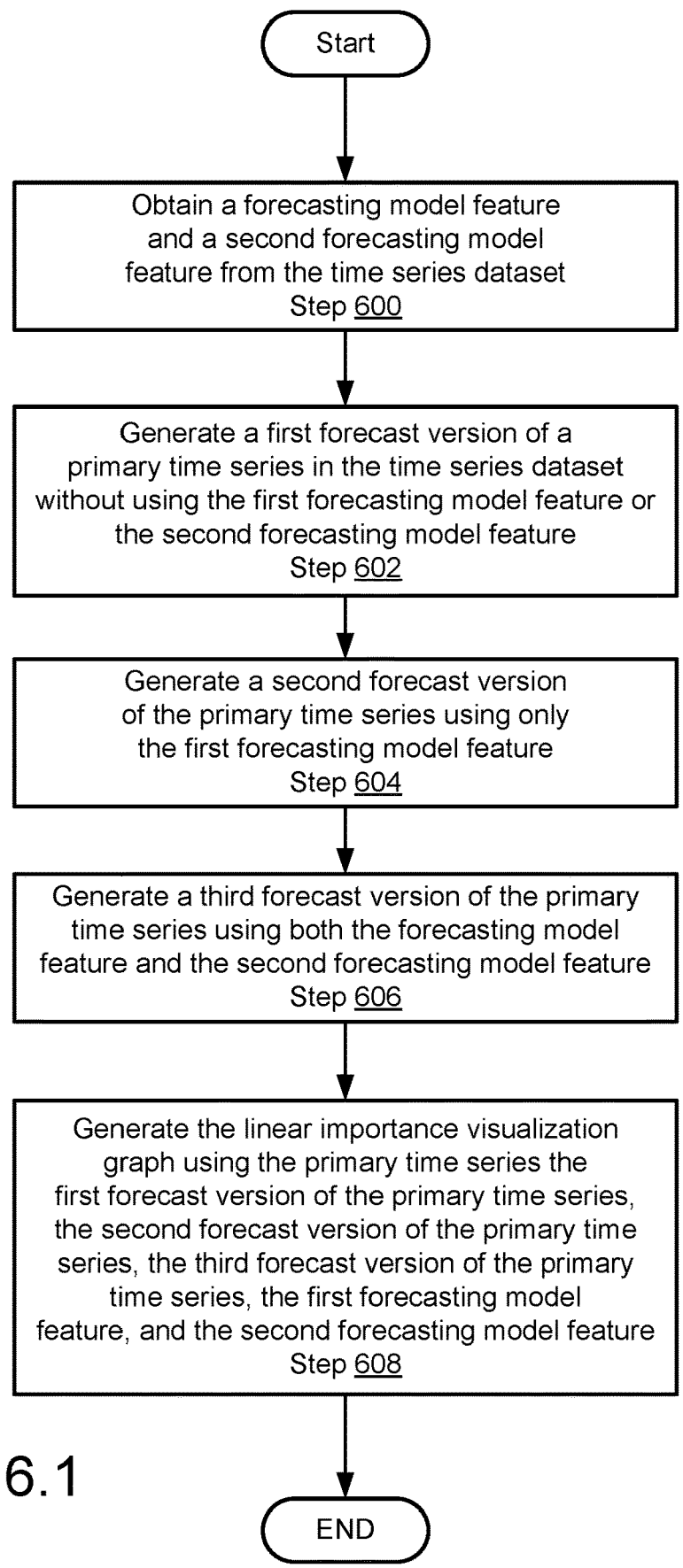
FIG. 6.1

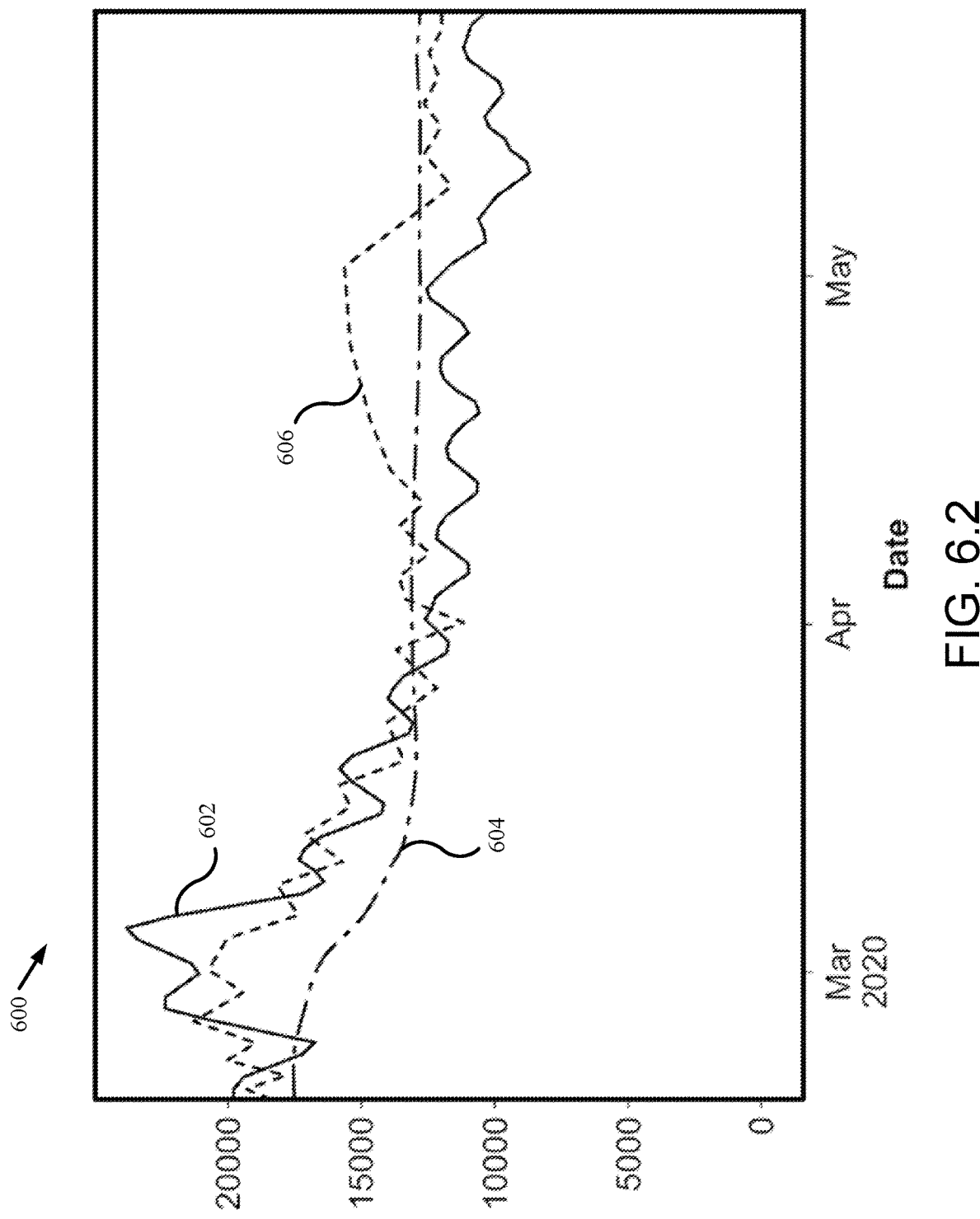
FIG. 6.2

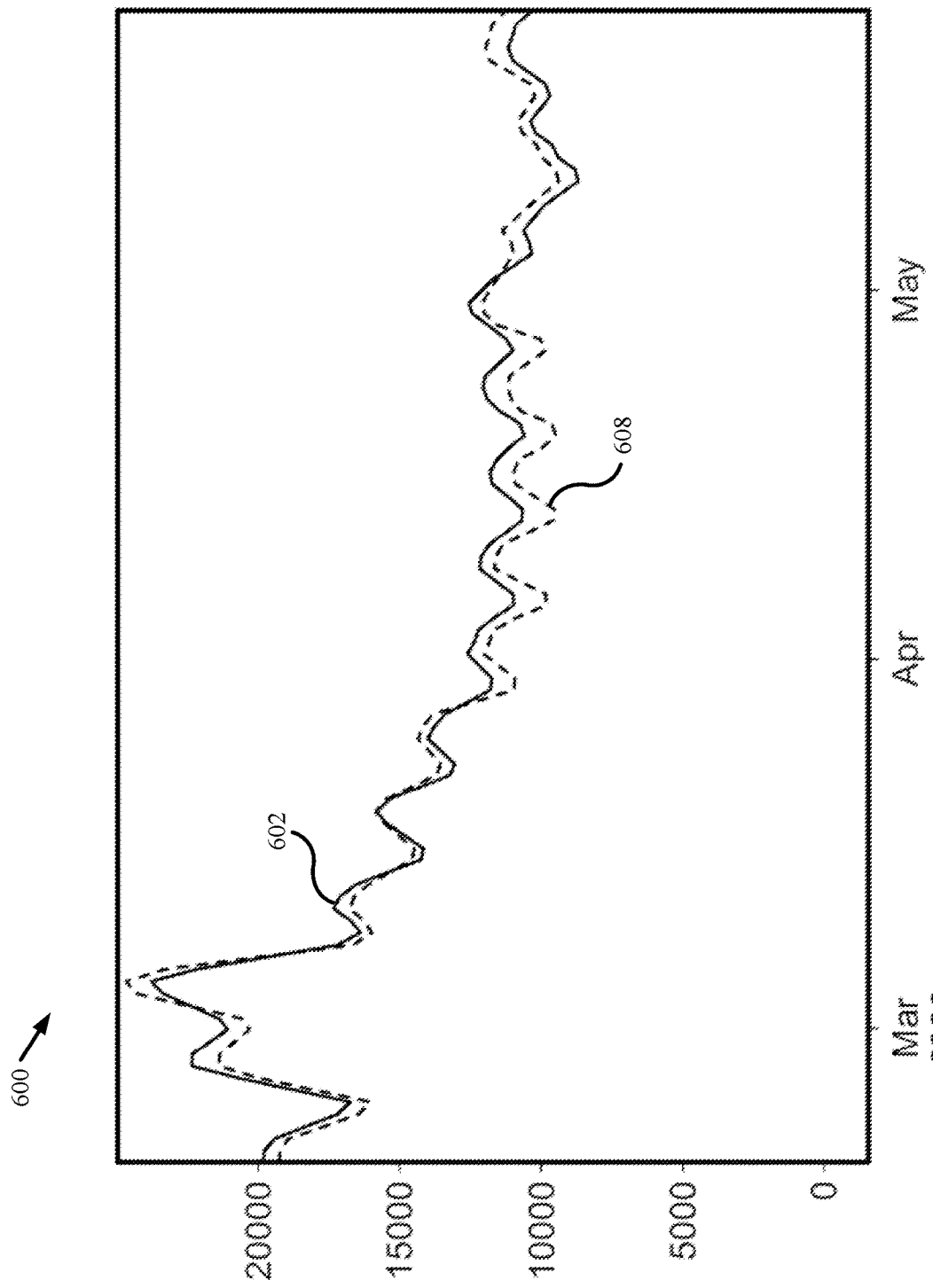
FIG. 6.3

TIMES SERIES MODEL EXPLAINABILITY

BACKGROUND

Machine learning (ML) models can be used to generate time series models including future forecasts of time series datasets. These time series datasets include multiple features and/or elements that can affect the future forecasts in different ways. However, current time series models lack the tools for users to visualize the importance of each feature and/or element on the future forecasts in order to better understand the effects of each feature and/or element on the future forecasts.

SUMMARY

In general, certain embodiments described herein relate to a method for visualizing time series models. The method comprises: obtaining a time series dataset, wherein the time series dataset comprises a plurality of forecasting model features; receiving, in response to obtaining the time series data set, instructions to generate a future forecast model for the time series dataset; generating, based on the instructions and by applying the time series data to a machine learning model comprising a time series forecaster, the future forecast model; and displaying, based on the generating and to a user on a display of a computing device, the future forecast model. The future forecast model comprises: a future prediction of the times series dataset; and at least one forecasting model feature visualization output illustrating an effect of at least one of the forecasting model features on the future prediction, wherein the at least one forecasting model feature visualization output to be generated is based on a selection of a forecasting model feature from among the forecasting model features and an explainability type, and information of the selection is included in the instructions.

In general, certain embodiments described herein relate to a non-transitory computer readable medium (CRM) comprising computer readable program code, which when executed by a computer processor enables the computer processor to perform a method for visualizing time series models. The method comprises: obtaining a time series dataset, wherein the time series dataset comprises a plurality of forecasting model features; receiving, in response to obtaining the time series data set, instructions to generate a future forecast model for the time series dataset; generating, based on the instructions and by applying the time series data to a machine learning model comprising a time series forecaster, the future forecast model; and displaying, based on the generating and to a user on a display of a computing device, the future forecast model. The future forecast model comprises: a future prediction of the times series dataset; and at least one forecasting model feature visualization output illustrating an effect of at least one of the forecasting model features on the future prediction, wherein the at least one forecasting model feature visualization output to be generated is based on a selection of a forecasting model feature from among the forecasting model features and an explainability type, and information of the selection is included in the instructions.

In general, certain embodiments described herein relate to a system comprising: a memory storing a time series dataset comprising a plurality of time series models; and a processor coupled to the memory. The processor is configured to: obtain a time series dataset, wherein the time series dataset comprises a plurality of forecasting model features; receive, in response to obtaining the time series data set, instructions to generate a future forecast model for the time series dataset; generate, based on the instructions and by applying the time series data to a machine learning model comprising a time series forecaster, the future forecast model; and display, based on the generating and to a user on a display of a computing device, the future forecast model. The future forecast model comprises: a future prediction of the times series dataset; and at least one forecasting model feature visualization output illustrating an effect of at least one of the forecasting model features on the future prediction, wherein the at least one forecasting model feature visualization output to be generated is based on a selection of a forecasting model feature from among the forecasting model features and an explainability type, and information of the selection is included in the instructions.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 2.1 shows a flowchart of a future forecast model generation process in accordance with one or more embodiments.

FIG. 2.2 shows a flowchart of a future forecast model generation process in accordance with one or more embodiments.

FIG. 3.1 shows a flowchart for generating one example of a forecasting model feature visualization output in accordance with one or more embodiments.

FIG. 3.2 shows a visual example embodying the forecasting model feature visualization described in the flowchart of FIG. 3.1.

FIG. 4.1 shows a flowchart for generating one example of a forecasting model feature visualization output in accordance with one or more embodiments.

FIG. 4.2 shows a visual example embodying the forecasting model feature visualization described in the flowchart of FIG. 4.1.

FIG. 5.1 shows a flowchart for generating one example of a forecasting model feature visualization output in accordance with one or more embodiments.

FIG. 5.2 shows a visual example embodying the forecasting model feature visualization described in the flowchart of FIG. 5.1.

FIG. 6.1 shows a flowchart for generating one example of a forecasting model feature visualization output in accordance with one or more embodiments.

FIGS. 6.2-6.3 show a visual example embodying the forecasting model feature visualization described in the flowchart of FIG. 6.1.

DETAILED DESCRIPTION

Figure 1:
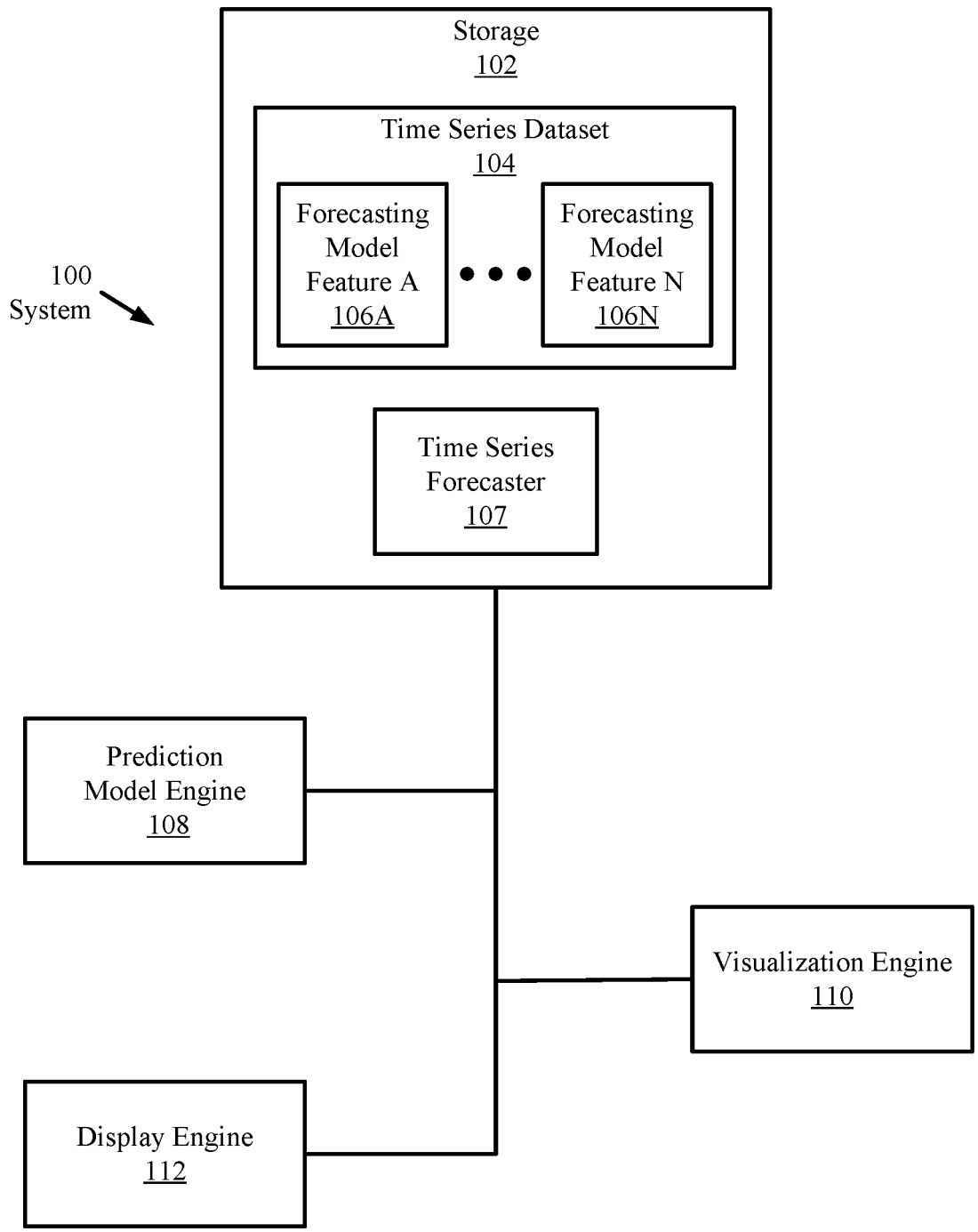
FIG. 1 shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed herein are directed to a system and method for generating visualizing time series models. In particular, in one or more embodiments disclosed herein, a time series forecaster including a machine learning (ML) model and a time series forecasting algorithm may be used to generate a future forecast model for a time series dataset. The future forecast model includes a future prediction showing a future forecast of the time series dataset. Rather than simply presenting the importance of a forecasting model feature in a limited manner, such as in the form of a number (e.g., a float number), the future forecast model of one or more embodiments may advantageously include at least one forecasting model feature visualization output that visually illustrates the effects of one or more forecasting model features on the future prediction. In one or more embodiments, a visualization output that visually illustrates the effects of an entirety of the time series dataset (i.e., a visualization output of a global model that is calculated over the entire time series dataset) may also be generated. Additionally, although this disclosure uses ML based models as a specific example, one of ordinary skill in the art would appreciate that one or more embodiments disclosed herein are not limited to ML based models. In particular, any kind of forecasting model (e.g., statistical models, neural network based models, etc.) may be used without departing for the scope of one or more embodiments disclosed herein.

These forecasting model feature visualization outputs provide users with a deeper understanding of different ways the forecasting model features can affect (i.e., alter and/or change) the future prediction. In particular, each forecasting model feature may have a positive, neutral, or negative effect on the future prediction. The magnitudes of these effects may vary and may also change over time. Consequently, having this understanding of the effects of the forecasting model features on the future prediction allows users to advantageously understand the main drivers of the results (i.e., the future prediction) in order to support decision making processes when planning ahead to implement changes to real world processes (e.g., lowering costs of transportation to optimize a delivery service model, changing manufacturing processes to increase product output, etc.).

FIG. 1 shows a system (100) in accordance with one or more embodiments. The system includes a storage (102), a prediction model engine (108), a visualization engine (110), and a display engine (112). In one or more embodiments disclosed herein, the system (100) may be part of a computing device (e.g., 700, FIG. 7). Each of these components of the system (100) will be described in more detail below.

As shown in FIG. 1, the system (100) includes the storage (102). The storage (102) may be persistent storage, volatile storage, or any combination thereof. The storage (102) is configured to store a time series dataset (104) comprising a plurality of forecasting model features (106A, 106N), and a time series forecaster (107). The time series dataset (104) may be any data structure (i.e., one or more lists, tables, collection of data values, etc.) storing historical time series data on one or more real world events and/or processes. For example, the time series dataset (104) may be directed to a performance of the stock market.

In one or more embodiments, each forecasting model feature (106A, 106N) of the time series dataset (104) may be an individual times series (i.e., a time series item including a series of data points indexed, listed, or graphed, in time order). Each individual time series may represent a feature and/or element that affects (i.e., plays a role in) the real world event and/or process depicted by the time series dataset (104). For example, in the above example where the times series dataset (104) is the performance of the stock market, one of the forecasting model features (106A, 106N) may be a time series showing the historical price of oil. As yet another example, assuming that the time series dataset (104) is directed to the field of demand forecasting, the forecasting model features (106A, 106N) may include information regarding past and future promotion plans and/or a schedule of special events (e.g., holidays, press conferences, quarterly earnings report postings, etc.).

In one or more embodiments, the forecasting model features (106A, 106N) may also illustrate historical data of a time series (e.g., seasonality, trend, lag, etc.). This is discussed in more detail below in FIGS. 3.1-3.2. All of the forecasting model features (106A, 160N) of the time series dataset (104) may be used during the generation a future prediction of the time series dataset (104). Each of the forecasting model features (106A, 106N) may also have different effects on a result of the future prediction for the time series data set (104).

In one or more embodiments, the time series forecaster (107) may be a ML model including one or more time series forecasting algorithms for generating a future prediction of the time series data set (104). Although the time series forecaster (107) is shown in FIG. 1 as data stored in the storage, one of ordinary skill would appreciate that the time series forecaster (107) may also be implemented separately in the form of hardware (i.e., circuitry), software, or any combination thereof similar to the prediction model engine (108), the visualization engine (110), and the display engine (112).

In one or more embodiments disclosed herein, the system (100) further includes the prediction model engine (108). The prediction model engine (108) may be implemented in hardware (i.e., circuitry), software, or any combination thereof. In one or more embodiments, the prediction model engine (108) may be configured to execute a generation of the future prediction using the time series dataset (104) and the time series forecaster (107) stored in the storage (102).

In particular, in one or more embodiments, the prediction model engine (108) may also constitute part of the ML model. For example, the prediction model engine (108) may utilize the time series forecasting algorithm in the time series forecaster (107) in combination with the ML model to generate the future prediction for the time series dataset (104). In one or more embodiments, any type of ML model and time series forecasting algorithm may be utilized to generate the future prediction. For example, the ML model may be one specifically developed and trained by a data-science-oriented company (e.g., a planning software company), and the time series forecasting algorithm may also similarly be one specifically developed and trained by the data-science-oriented company.

In one or more embodiments disclosed herein, the system (100) further includes the visualization engine (110). The visualization engine (110) may be implemented in hardware (i.e., circuitry), software, or any combination thereof. In one or more embodiments, the visualization engine (110) may be configured to execute a generation of one or more forecasting model feature visualization outputs using one or more information (i.e., data) from the forecasting model features (106A, 106N) of the time series data set (104), the future prediction generated for the time series data set (104), and the time series forecaster (107) used to generate the future prediction for the time series data set (104).

In one or more embodiments, each of the one or more forecasting feature visualization outputs may be a visual tool (i.e., a chart, a graph, a picture, etc.) conveying the effects of one or more forecasting model features (106A, 106N) on the future prediction in a visual format. Said another way, each of the one or more forecasting feature visualization outputs visualizes the effects of one or more forecasting model features (106A, 106N) on the future prediction. Specific non-limiting examples of the forecasting feature visualization outputs of one or more embodiments are discussed and illustrated in more detail below in FIGS. 3.1-6.3.

In one or more embodiments disclosed herein, the prediction model engine (108) may also be configured to receive instructions to generate a future forecast model for the time series dataset (104). The future forecast model includes the future prediction of the time series dataset and at least one of the forecasting model feature visualization outputs.

In one or more embodiments, the instructions to generate the future forecast may be received through a graphical user interface (GUI) allowing a user to select a time series data (104) and configure a time series forecaster (107) and ML model for generating the future prediction. The GUI (not shown) may also include options for users to select one or more of the forecasting model features (106A, 106N) of interest of the user and an explainability type to generate at least one type of forecasting model feature visualization output showing the effects of the selected forecasting model features (106A, 106N) on the future prediction. The GUI may also include options for generating one of each explainability type of forecasting model feature visualization outputs for each of the forecasting model features (106A, 106N). The explainability types are discussed and illustrated in more detail below in FIGS. 3.1-6.3.

In one or more embodiments, in response to receiving the instructions to generate the future forecast model, the prediction model engine (108) may cause the visualization engine (110) to generate the one or more forecasting model feature visualization outputs selected by the user. For example, the prediction model engine (108) may parse the received instructions for information directed to the selected explainability type(s) and forecasting model feature(s) (106A, 106N). This information is then transmitted to the visualization engine (110) to cause the visualization engine (110) to generate the intended forecasting model feature visualization output(s).

In one or more embodiments disclosed herein, the system (100) further includes the display engine (112). The display engine (112) may be implemented in hardware (i.e., circuitry), software, or any combination thereof. In one or more embodiments, the display engine (112) may be coupled to a display (e.g., 708, FIG. 7) of a computing system (e.g., 700, FIG. 7) and configured to cause the display to display the future forecast model to a user of the computing system. In one or more embodiments, the display engine (112) may also be configured to display the GUI for receiving instructions for generating one or more future prediction models.

Although the system (100) is shown as having four components (102, 108, 110, 112), in other embodiments of the invention, the system (100) may have more or fewer components. Further, the functionality of each component described above may be split across components or combined in a single component (e.g., the functionalities of the prediction model engine (108) and visualization engine (110) may be combined to be implemented by a single component). Further still, each component (102, 108, 110, 112) may be utilized multiple times to carry out an iterative operation.

Turning now to FIG. 2.1, FIG. 2.1 shows a flowchart of a future forecast generation process in accordance with one or more embodiments disclosed herein. The method depicted in FIG. 2.1 may be performed to generate a future forecast model using a time series data set (e.g., 104, FIG. 1) and a time series forecaster (e.g., 107, FIG. 1). The method shown in FIG. 2.1 may be performed, for example, by a combination of the prediction model engine (e.g., 108, FIG. 1) and the visualization engine (e.g., 110, FIG. 1). Other components of the system in FIG. 1 may perform all, or a portion, of the method of FIG. 2.1 without departing from the scope of the embodiments described herein.

While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 200, a time series dataset comprising a plurality of forecasting model features (e.g., 106A-106N, FIG. 1) is obtained and stored in a storage (e.g., 102, FIG. 1). In one or more embodiments, the time series dataset may be obtained from any source (e.g., a local computer, a network, an external storage device, etc.). The time series dataset may also be in any size and any format (e.g., a zip file, a folder including individual files of each component of the time series dataset, etc.). Furthermore, the time series dataset may include any number of forecasting model features and maybe stored in the storage as a data structure.

In Step 202, an instruction to generate a future forecast model for the time series dataset is received. As discussed above in reference to FIG. 1, the instruction may be received through a GUI displayed on a display of a computing device. Additionally, the instruction may include information including: (i) information identifying a time series dataset stored in the storage (e.g., a name of the time series dataset, a folder path specifying a location of the time series dataset in the storage, etc.); (ii) information identifying a time series forecaster stored in the storage (e.g., a name assigned to the time series forecaster, a folder path specifying a location of the time series forecaster in the storage, etc.); (iii) information identifying one or more forecasting model features in the time series dataset; and (iv) information identifying one or more explainability types for generating one or more forecasting model feature visualization outputs for the selected forecasting model features.

In one or more embodiments, the time series forecaster may be pre-stored in the storage. For example, the computing system may be a computing system specifically configured for: (i) training the ML model and time series forecasting algorithm of the time series forecaster; and (ii) generating the future forecast model using the trained ML model and time series forecasting algorithm. Alternatively, the time series forecaster may be obtained from an external source (e.g., a storage on the network, an external storage device, etc.).

In Step 204, based on the instructions received in Step 202, the future forecast model is generated using the time series dataset and the time series forecaster. In one or more embodiments, the instructions are received and parsed by the prediction model engine. The prediction model engine uses above-referenced information (i) and (ii) from the instructions to generate a future prediction for the future prediction model. The prediction model engine further transmits above-referenced information (i)-(iv) including in the instructions to the visualization engine for generating one or more forecasting model feature visualization outputs to be included with the future prediction model. Additional details of Step 204 are discussed below in FIG. 2.2.

Figure 7:
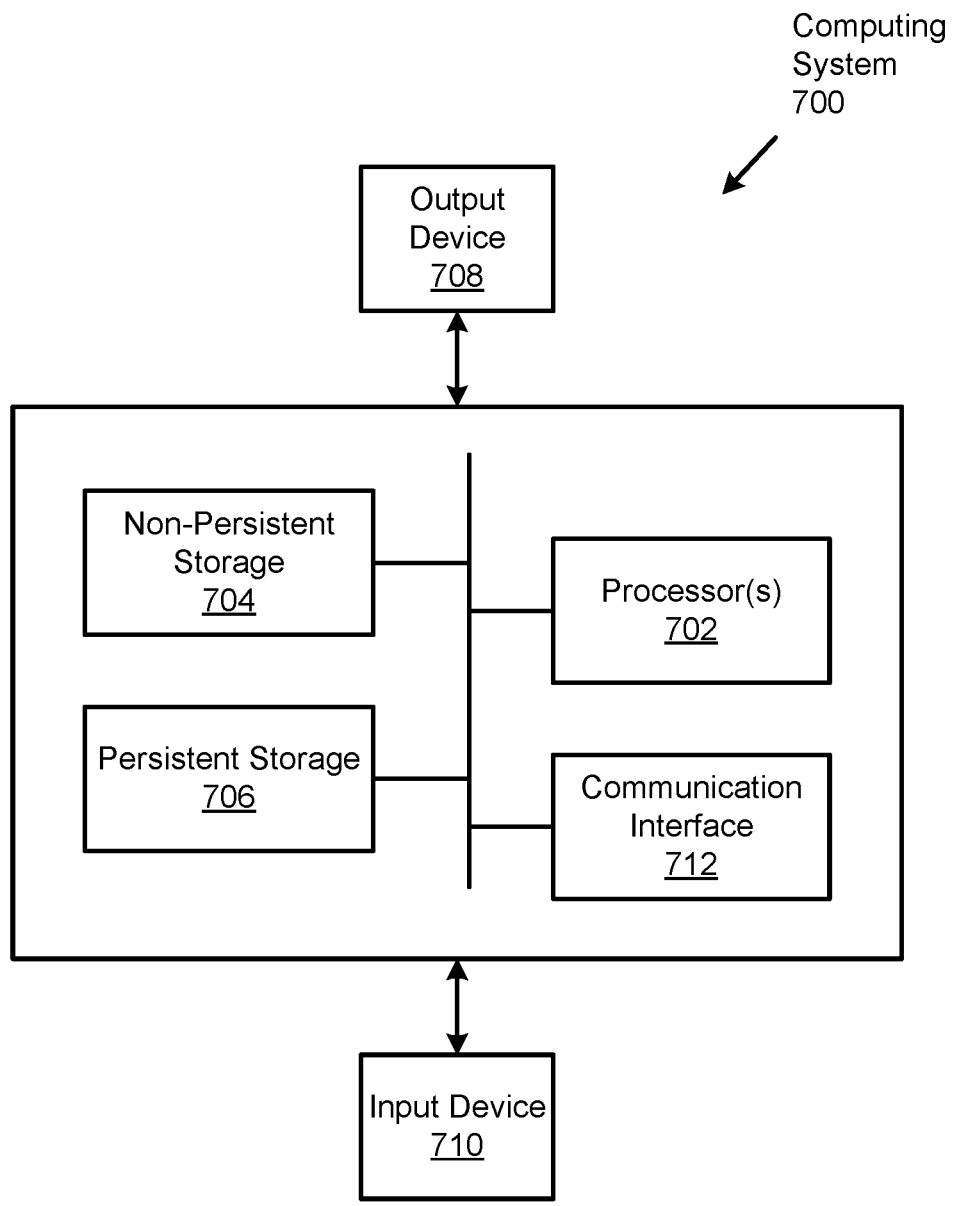
FIG. 7 shows a computer system in accordance to one or more embodiments.

In Step 206, the generated future forecast model is displayed on a display of the computing device (e.g., computing system 700 of FIG. 7). In one or more embodiments, the display engine receives the outputs generated by the model prediction engine and the visualization engine and aggregates these outputs into a user-friendly display format (e.g., an application including sub-tabs for each of the future prediction and the one or more forecasting model feature visualization outputs). Alternatively, the future forecast model may be displayed in any visual format that would allow the user to easily read and parse through all of the generated information.

Turning now to FIG. 2.2, FIG. 2.2 shows a flowchart of a future forecast generation process in accordance with one or more embodiments disclosed herein that further elaborates on Step 204 of FIG. 2.1. The method depicted in FIG. 2.2 may be performed to generate a future forecast model using a time series data set (e.g., 104, FIG. 1) and a time series forecaster (e.g., 107, FIG. 1). The method shown in FIG. 2.2 may be performed, for example, by a combination of the prediction model engine (e.g., 108, FIG. 1) and the visualization engine (e.g., 110, FIG. 1). Other components of the system in FIG. 1 may perform all, or a portion, of the method of FIG. 2.2 without departing from the scope of the embodiments described herein.

While FIG. 2.2 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 210, a future prediction of the time series dataset is generated using the time series dataset and the time series forecaster. As discussed above in reference to FIGS. 1 and 2.1, the future prediction of the time series dataset may be generated by the prediction model engine to be part of the future prediction model. In one or more embodiments, the future prediction of time series dataset may be a time series, or an aggregate of data points and various labels, depicting a possible future result (i.e., a future trend) of the time series dataset.

For example, assume that the time series dataset is directed to demand forecasting in the oil industry. The future prediction may be a future forecast of a demand of oil in a certain state, city, and/or country. As another example, assume that the time series data is directed to forecasting certain aspects of the stock market. The future prediction may be a future forecast of a particular stock (or of the entire stock market) based on external historic factors (i.e., the forecasting model features) such as oil price, unemployment rate, etc.

In Step 212, a forecasting model feature visualization output is generated. In one or more embodiments, as discussed above in reference to FIGS. 1 and 2.1, the forecasting model feature visualization output may be generated by the visualization engine based on information included in an instruction for generating a future forecast model received from a user. Each of the forecasting model feature visualization outputs illustrates an explainability of one or more forecasting model features on the future prediction. Said another way, each of the forecasting model feature visualization outputs explains an effect of one or more forecasting model features on the future predictions. Additionally, a visualization output may be generated for an entirety of the time series dataset (i.e., a visualization output is generated for a global model that is calculated over the entire time series dataset) to illustrate the explainability of the time series dataset as a whole.

In one or more embodiments, the explainability of each forecasting model feature visualization output (i.e., the way that each forecasting model feature visualization output explains the effects of the one or more forecasting model features on the future prediction) may be different. Non-limiting examples of different forecasting model feature visualization outputs in accordance with one or more embodiments disclosed herein are discussed and illustrated in more detail below in FIGS. 3.1-6.3.

Non-limiting examples of the forecasting model feature visualization outputs in accordance with one or more embodiments are now discussed below in FIGS. 3.1-6.3.

Firstly, FIG. 3.1 shows a flowchart for generating one example of a forecasting model feature visualization output in accordance with one or more embodiments. In particular, the method depicted in FIG. 3.1 may be performed to generate a visual decomposition graph of time-based components (hereinafter referred to as "visual decomposition graph"). The method shown in FIG. 3.1 may be performed, for example, by the visualization engine (e.g., 110, FIG. 1). Other components of the system in FIG. 1 may perform all, or a portion, of the method of FIG. 3.1 without departing from the scope of the embodiments described herein.

While FIG. 3.1 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 300, a forecasting model feature is obtained from the time series dataset. In one or more embodiments, the forecasting model feature is obtained by the visualization engine based on a selection by a user on the GUI discussed above in reference to FIG. 1. This selection by the user is included in the instructions for generating the future prediction model.

In one or more embodiments, the instructions may also include an explainability type of "visual decomposition of the seasonality components." This explainability type notifies the visualization engine that the forecasting model feature visualization output to be generated is a visual decomposition graph and that the forecasting model feature is a time series.

In Step 302, the time series constituting the forecasting model feature is divided into time-based components. In one or more embodiments, the visualization engine may remove a trend component of a time series to obtain the time-based components. A period of each time-based component is determined by a user through a selection on the GUI. Alternatively, the period of each time-based component may be pre-defined by the system (e.g., system 100, FIG. 1). This information of the period is included in the instructions to generate the future prediction.

In one or more embodiments disclosed herein, the period of each time-based component may be set to any length to allow clear representation of the effects of each element in the period. For example, assume that the period is one week. Each element in the period corresponds to the days in a week (e.g., Monday through Sunday). The visual decomposition graph may reveal information such as which days of the week and/or which weeks of the time series could have an effect on the future prediction. Said another way, the visual decomposition graph reveals a seasonal effect of the time series on the future prediction.

In one or more embodiments, a size of the period (i.e., a period size) may not be constant. For example, assume that the period size is one month. Some months of the year (e.g., January and March) may have more days than other months (e.g., June and September). As a result, some time-based components have periods longer than other time-based components.

In Step 304, a mean time-based component is generated using the time-based components divided in Step 302. In one or more embodiments, the mean time-based component may be generated by calculating an average for each element in the period. For example, using the same example above where the period corresponds to the days in a week, the average across each day of the week is calculated to generate the mean time-based component. Furthermore, one of ordinary skill in the art would appreciate that other methods for calculating the mean time-based component may be employed without departing from the scope of the embodiments described herein. In one or more embodiments, in addition to or separately from the mean time-based component, a median time-based component may also be generated using the time-based components divided in Step 302. In particular, the medial time-based component may be generated by selecting the median among the time-based components divided in Step 302.

In Step 306, all of the time-based components and the mean time-based components are overlaid on a visual decomposition graph. In one or more embodiments, the visual decomposition graph may be generated by the visualization engine. The x-axis of the visual decomposition graph is the user-selected period while the y-axis is the value of each data point in the time series corresponding to the respective elements within the user-selected period.

In Step 308, an area on the visual decomposition graph covered by a predetermined percentage of the time-based components is determined. In one or more embodiments, the visualization engine may analyze all of the time-based components to calculate which parts of the visual decomposition graph are covered by a predetermined percentage (e.g., 80%, 90%, etc.) of the time-based components. One of ordinary skill in the art would appreciate that any calculation method may be employed in Step 308 to determine the area without departing from the scope of the embodiments described herein.

In Step 310, a shading is applied to the area determined in Step 308. In one or more embodiments, other methods of visualizing the area covered by the predetermined percentage of the time-based components outside of shading the area may be employed as long as the user is able to clearly visualize (i.e., clearly see and identify) the area covered by the predetermined percentage of the time-based components. This shaded area in combination with the individual time-based components as well as the mean time-based component may be used to reveal which elements (e.g., which days of the week, which days of the month, etc.) of a period have the highest or lowest values across the entire time series data. This information reveals the effects (i.e., a seasonality effect) of each element on the future prediction.

To further clarify embodiments of the invention, a non-limiting example of a visual decomposition graph according to one or more embodiments is provided in FIG. 3.2.

Beginning of Example

FIG. 3.2 shows a visual decomposition graph (300) for a selected time series making up a forecasting model feature. As shown in FIG. 3.2, the time-based components (i.e., cycles; shown using the thinner lines) (302) are based on each day in a week (i.e., Sunday through Saturday). In particular, each cycle (302) of the times series is overlaid on top of one another on the visual decomposition graph (300). A mean cycle (304) (shown using the single thick line) of all of the cycles (302) is also overlaid on the visual decomposition graph (300).

Additionally, an area (306) (delimited by the broken lines) of the visual decomposition graph (300) is shaded to show an area of the visual decomposition graph (300) covered by eighty (80) percent of the cycles (302) of the time series. The visual decomposition graph (300) in FIG. 3.2 shows that Mondays are the strongest-performing days while Thursday and Fridays are the weakest-performing days.

End of Example

Turning now to FIG. 4.1, FIG. 4.1 shows a flowchart for generating one example of a forecasting model feature visualization output in accordance with one or more embodiments. In particular, the method depicted in FIG. 4.1 may be performed to generate a short-term-long-term explainability chart. The method shown in FIG. 4.1 may be performed, for example, by the visualization engine (e.g., 110, FIG. 1). Other components of the system in FIG. 1 may perform all, or a portion, of the method of FIG. 4.1 without departing from the scope of the embodiments described herein.

While FIG. 4.1 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 400, a forecasting model feature is obtained from the time series dataset. In one or more embodiments, the forecasting model feature is obtained by the visualization engine based on a selection by a user on the GUI discussed above in reference to FIG. 1. This selection by the user is included in the instructions for generating the future prediction model. In one or more embodiments, the forecasting model feature may also be selected by any one of the prediction model engine (108) and/or the visualization engine (110) based on one or more actions to be performed by the system (100) of FIG. 1.

In one or more embodiments, the instructions may also include an explainability type of "short-term-long-term importance." This explainability type notifies the visualization engine that the forecasting model feature visualization output to be generated is a short-term-long-term explainability chart and that the forecasting model feature is a time series. In one or more embodiments, the forecasting model feature may be one of the time-based components discussed above in reference to FIGS. 3.1-3.2. For example, the time-based component may be very influential (i.e., may have a larger effect on the future prediction) in the short term but have little significance (i.e., have little to no effect on the future prediction) when observing long term changes of the future prediction.

In Step 402, an effect of the forecasting model feature on the future prediction over a first period of time is analyzed to generate a short-term importance value. In Step 404, an effect of the forecasting model feature on the future prediction over a second period of time longer than the first period of time is analyzed to generate a long-term importance value.

In one or more embodiments, the analysis in Step 402 and Step 404 may be done using a window-dependent feature importance. This may be done by applying a feature importance method, limited to all sub-windows of size N of the time series (i.e., the future prediction), and averaging over all windows. This feature importance method allows a user to visualize which features are important over different horizons of time of the future prediction. This data can be converted into the short-term importance value and the long-term importance value. One of ordinary skill in the art would appreciate that other method for determining a short-term importance and a long-term importance of a forecasting model feature may be employed without departing from the scope of the embodiments described herein. For example, the following steps may be executed to determine the short-term importance and the long-term importance of a forecasting model feature: (i) select a horizontal length of interest N; (ii) split a forecasting model feature (or all forecasting model features used for training and/or generating a model) into all continuous sub-windows of size N; (iii) compute feature importance for some model on each of the sub-windows; (iv) for each forecasting model feature, take the mean of all feature importance scores calculated on the different sub-windows; and (v) repeating steps (i) through (iv) for other N value where the N value can represent any period (e.g., 1 month, 2 months, 6 months, 1 year, etc.). Furthermore, in step (iii): (a) not every model has the capacity for computing feature importance on a subset of the data; and (b) linear regression may be used, where this is possible by taking the product of the standard deviation of each feature with the coefficient attributed to said feature by the model (e.g., a feature 1 that has coefficient 2.5 and standard deviation of 10 in sub-window 1 will have an importance of 25 in this sub-window 1 while the same feature 1 having coefficient 2.5 and standard deviation of 9 in sub-window 2 will have an importance of 22.5).

In Step 406, short-term importance value and the long-term importance value are plotted on a short-term-long-term explainability chart generated by the visualization engine. A non-limiting example of the short-term-long-term explainability chart is shown below in FIG. 4.2.

To further clarify embodiments of the invention, a non-limiting example of a short-term-long-term explainability chart according to one or more embodiments is provided in FIG. 4.2.

Beginning of Example

FIG. 4.2 shows a short-term-long-term explainability chart (400). The y-axis of the short-term-long-term explainability chart (400) lists a plurality of features (402) while the x-axis illustrates an importance value. Each of the features (402) include a long-term importance (404) and a short-term importance (406). The short-term-long-term explainability chart (400) compares the long-term importance of each feature (404) with its respective short-term importance (406). As shown in FIG. 4.2, feature 4 (F4) has relatively more short-term importance than long-term importance. In contrast, feature 1 (F1) has relatively more long-term importance than short-term importance.

Turning now to FIG. 5.1, FIG. 5.1 shows a flowchart for generating one example of a forecasting model feature visualization output in accordance with one or more embodiments. In particular, the method depicted in FIG. 5.1 may be performed to generate an outlier events visualization chart. The method shown in End of Example FIG. 5.1 may be performed, for example, by the visualization engine (e.g., 110, FIG. 1). Other components of the system in FIG. 1 may perform all, or a portion, of the method of FIG. 5.1 without departing from the scope of the embodiments described herein.

While FIG. 5.1 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 500, a forecasting model feature is obtained from the time series dataset. In one or more embodiments, the forecasting model feature is obtained by the visualization engine based on a selection by a user on the GUI discussed above in reference to FIG. 1. This selection by the user is included in the instructions for generating the future prediction model.

In one or more embodiments, the instructions may also include an explainability type of "outlier events explainability." This explainability type notifies the visualization engine that the forecasting model feature visualization output to be generated is an outlier events visualization chart and that the forecasting model feature is a time series directed to a schedule of events (e.g., holidays, press conferences, quarterly earnings report postings, etc.). The time series directed to the schedule of events may include data directed to events that are classified as potential outlier events by the user.

In Step 502, a second future prediction is generated using the time series directed to the schedule of events. In one or more embodiments, this second future prediction is generated separately from the future prediction generated in Step 210 of FIG. 2.2. Specifically, this second future prediction (although may be identical to the future prediction generated in Step 210 of FIG. 2.2) is generated for the outlier events visualization chart. In particular, in the context of this disclosure and only with respect to the "outlier events explainability" explainability type, the future predictions generated for this explainability type reflect a prediction on training and/or historical data used for explaining past behavior that is helpful for understanding future behavior. Said another way, the future predictions generated for this explainability type is not an actual prediction of the future but rather a prediction of past events (e.g., training data used to train a forecasting model) that is compared with real, past data.

In Step 504, a third future prediction is generated without using the time series directed to the schedule of events. In one or more embodiments, the visualization engine omits the time series directed to the schedule of events when generating the third future prediction. As a result, the third future prediction shows a version the future prediction that is not affected by the data included in the time series directed to the schedule of events (i.e., not affected by data directed to potential outlier events).

In Step 506, the second future prediction and the third future prediction are overlaid on the outlier event visualization chart. In one or more embodiments, the visualization engine generates the outlier event visualization chart as a graphical chart with a period of time (e.g., months of the year) on the x-axis and values of each data point of the second future prediction and third future prediction on the y-axis. The second future prediction and the third future prediction are then overlaid (i.e., plotted) on the outlier event visualization chart generated by the visualization engine.

In Step 508, differences between the second future prediction and the third future prediction that exceed a predetermined outlier threshold are marked on the outlier events visualization chart. In one or more embodiments, the predetermined outlier threshold may be a value that is preset by the user. This value may be determined by the user as being indicative of a possible outlier event that occurred during the historical data of the time series dataset. In one or more embodiments, the differences may be marked on the outlier events visualization chart in any manner (e.g., circled, highlighted, etc.) to allow a user to easily visualize and identify the points on the chart where each of the differences occur.

In one or more embodiments, these differences may show the effects of outlier events (i.e., events with relatively rare occurrences throughout the year such as holidays) on the future prediction. For example, differences identified toward the end of December may show users that the Christmas holiday has a significant effect (i.e., has a positive or negative effect exceeding a user set threshold) on the future prediction of the time series dataset.

To further clarify embodiments of the invention, a non-limiting example of an outlier events visualization chart according to one or more embodiments is provided in FIG. 5.2.

Beginning of Example

FIG. 5.2 shows an outlier events visualization chart (500). The outlier events visualization chart (500) includes a first future prediction (502) (shown using long-dash-dot-long-dash broken line) generated using the time series directed to the schedule of events and a second future prediction (504) (shown using the solid line) generated without using the time series directed to the schedule of events.

As further shown in FIG. 5.2, differences (506) (shown using the uniform broken lines) between the first future prediction (502) and second future prediction (504) that exceed a predetermined outlier threshold are marked. Based on the date information on the x-axis of the outlier events visualization chart (500), these differences (506) identify one or more holidays and/or special events throughout the time series dataset as outlier events. Additionally, one or more markers (508) identifying a predetermined amount of time around each outlier event may be added. These markers (508) not only identifies the specific date on which an outlier event occurs but also marks a start and stop of the outlier event to show other dates and/or days that are affected by an outlier event.

End of Example

Finally, turning to FIG. 6.1, FIG. 6.1 shows a flowchart for generating one example of a forecasting model feature visualization output in accordance with one or more embodiments. In particular, the method depicted in FIG. 6.1 may be performed to generate a linear importance visualization graph. The method shown in FIG. 6.1 may be performed, for example, by the visualization engine (e.g., 110, FIG. 1). Other components of the system in FIG. 1 may perform all, or a portion, of the method of FIG. 6.1 without departing from the scope of the embodiments described herein.

While FIG. 6.1 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 600, a first forecasting model feature and a second forecasting model feature are obtained from the time series dataset. In one or more embodiments, more than two forecasting model features may be obtained by the visualization engine. Additionally, all of the forecasting model features of the time series dataset may be obtained.

In one or more embodiments, the instructions received from the GUI may include an explainability type of "linear importance of visualizations." This explainability type notifies the visualization engine that the forecasting model feature visualization output to be generated is a linear importance visualization graph. The instructions may also include forecasting model features selected by a user, which would determine the number of forecasting model features obtained by the visualization engine.

In Step 602 a first forecast version of a primary time series in the time series dataset is generated without the first forecasting model feature or the second forecasting model feature. In one or more embodiments, the primary time series in the times series dataset is a collection of historic data normally used by the prediction model engine to generate the future prediction along with the other components of the time series dataset. For example, assume the time series dataset is directed to track a price of a specific stock of the stock market. The primary time series is a collection of the historic stock price of the specific stock over a predetermined time period set by a user.

In one or more embodiments, the first forecast version of the primary time series is a future forecast generated for the primary time series using the ML model and the time series forecasting algorithm of the time series forecaster. Theoretically, if the first forecast version of the primary time series is generated using all of the forecasting model features (i.e., the first and second forecasting model features) instead of without, the resulting first forecast version would track (i.e., would be identical to) the primary time series.

In Step 604, a second forecast version of the primary time series is generated using only the first forecasting model feature. In one or more embodiments, the second forecast version of the primary time series shows the effect of the first forecasting model feature on a potential future prediction generated for the primary time series. For example, assume that the first forecast version is completely different from and does not reflect any trends of the primary time series. Further assume that the second forecast version of the primary time series more closely reflects the shape and trends of the primary time series. This reveals that the first forecasting model feature contributes significantly (i.e., has a large effect) to the forecast version of the primary time series.

In particular, when a future prediction is being created, the time series forecaster utilizes each forecasting model feature iteratively, adding forecasting model features one after another. When considering a next forecasting model feature to be added, the prediction model engine normally calculates an added value of this forecasting model feature on top of a value already gained from the addition of precious forecasting model features. Said another way, the linear importance visualization graph of one or more embodiments mimics a future prediction creation processing by showing the direct (i.e., linear) effects of each added forecasting model feature to the final and completed future prediction.

In Step 606, a third forecast version of the primary time series using both the forecasting model feature and the second forecasting model feature is generated. In one or more embodiments, the third forecast version using all of the forecasting model features should be identical in shape and trend to the primary time series.

In Step 608, a linear importance visualization graph is generated using the primary time series, the first forecast version of the primary time series, the second forecast version of the primary time series, the third forecast version of the primary time series, the first forecasting model feature, and the second forecasting model feature. In one or more embodiments, the linear importance visualization graph may be presented in any visual format that would allow a user to easily visualize and identify the effects of each forecasting model feature on the forecast versions of the primary time series.

For example, in one or more embodiments, the linear importance visualization graph may be an animated graph employing one or more animations. In particular, as one non-limiting example, the linear importance visualization graph may start off as a graph showing only: (i) the primary time series as historical data; and (ii) the first forecast version of the primary time series. Using an animation effect, the first forecasting model feature may appear on the linear importance visualization graph and visually merge (using another animation effect) with the first forecast version of the primary time series. Once merged, the first forecasting model and the first forecast version of the primary time series may be replaced (using yet another animation effect) with the second forecast version of the primary time series. This animated process is repeated until the forecast version of the primary times series matches (i.e., becomes identical to) the primary times series. In one or more embodiments, the full process of the animation is automatically repeated. Alternatively, a user may manually activate a repeat of the animation.

To further clarify embodiments of the invention, a non-limiting example of a linear importance visualization graph according to one or more embodiments is provided in FIGS. 6.2-6.3.

Beginning of Example

FIG. 6.2 shows a linear importance visualization graph (600). The linear importance visualization graph (600) includes historical data (602) of a primary time series of the time series dataset, a first forecast version (604) of the historical data (602) generated without any of the forecasting model features in the time series dataset, and a forecasting model feature (606).

FIG. 6.3 shows the linear importance visualization graph (600) after the first forecast version (604) merges with the forecasting model feature (606) using an animation effect. This merging generates a second forecast version (608) of the historical data (602) generated using the forecasting model feature (606). The second forecast version (608) is close to becoming identical to the historical data (602). This reveals the potential effects of the forecasting model feature (606) on an actual future prediction generated for the primary time series.

Eventually, the second forecast version (608) will be merged with a second forecasting model feature (not shown) to generate a third forecast version (not shown) of the historical data (602). This merging process is iteratively executed until the currently displayed forecast version of the historical data (602) matches the historical data (602).

End of Example

FIG. 7 shows a computer system in accordance to one or more embodiments.

Embodiments disclosed herein may be implemented using computing devices. FIG. 7 shows a diagram of a computing device in accordance with one or more embodiments disclosed herein. Computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), communication interface (712) (e.g., Bluetooth interface, infrared interface, network interface, optical interface, etc.), input devices (710), output devices (708), and numerous other elements (not shown) and functionalities. Each of these components is described below.

In one embodiment disclosed herein, computer processor(s) (702) may be an integrated circuit for processing instructions. For example, the computer processor(s) may be one or more cores or micro-cores of a processor. Computing device (700) may also include one or more input devices (710), such as a touchscreen, keyboard, mouse, microphone, touchpad, electronic pen, or any other type of input device. Further, communication interface (712) may include an integrated circuit for connecting computing device (700) to a network (not shown) (e.g., a local area network (LAN), a wide area network (WAN) such as the Internet, mobile network, or any other type of network) and/or to another device, such as another computing device.

In one embodiment disclosed herein, computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (702), non-persistent storage (704), and persistent storage (706). Many different types of computing devices exist, and the aforementioned input and output device(s) may take other forms.

Embodiments disclosed herein may provide the ability for users to quickly and easily discern which features and/or elements making up a time series dataset have an effect on a future prediction of the time series dataset. In particular, rather than presenting an importance of a feature and/or element using only numerical values (e.g., in the form of a float number), visual tools such as graphs, tables, charts, and/or animated figures are employed.

These visual tools advantageously provide users with a deeper understanding of different ways the features and/or elements can affect (i.e., alter and/or change) the future prediction of the time series dataset. Consequently, users having these visual tools may be better equipped to understand the main drivers of the results (i.e., the future prediction) in order to support decision making processes when planning ahead to implement changes to real world processes (e.g., lowering costs of transportation to optimize a delivery service model, changing manufacturing processes to increase product output, etc.).

For example, if a visual tool reveals that a certain feature and/or element (e.g., oil prices) has little to no effect on the future prediction (e.g., stock market changes), a user may easily and readily know to omit that feature and/or element from consideration. Consequently, this reduces the amount of data that may be required to generate subsequent future predictions for the times series data set, which advantageously improves a functionality of the computing device generating the future predictions since fewer computer resources will be required to analyze and process the reduced amount of data.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for visualizing time series models, the method comprising:
obtaining, by a visualization engine, a time series dataset, wherein the time series dataset comprises a plurality of forecasting model features;
receiving, in response to obtaining the time series data set, instructions to generate a future forecast model for the time series dataset, wherein the future forecast model comprises:
a future prediction of the times series dataset; and
at least one forecasting model feature visualization output illustrating an effect of at least one of the forecasting model features on the future prediction,
wherein the at least one forecasting model feature visualization output to be generated is based on a selection of a forecasting model feature from among the forecasting model features and an explainability type, and information of the selection is included in the instructions, wherein the explainability type notifies the visualization engine that the at least one forecasting model feature visualization output is a visual decomposition graph;
generating, based on the instructions and by applying the time series data to a machine learning model comprising a time series forecaster, the future forecast model, wherein the time series data further comprises a primary time series covering a period of time, and the future prediction is generated for the primary time series, wherein generating the at least one forecasting model feature visualization output comprises generating a linear importance visualization graph,
wherein generating the linear importance visualization graph comprises:
generating, using the machine learning model:
a first forecast version of the primary time series over the period of time without the forecasting model feature and a second forecasting model feature among the forecasting model features;
a second forecast version of the primary time series over the period of time using only the forecasting model feature;
a third forecast version of the primary time series over the period of time using both the forecasting model feature and the second forecasting model feature;
plotting the primary time series and the first forecast version of the primary time series on the linear importance visualization graph,
introducing, using a first animated effect, the forecasting model feature onto the linear importance visualization graph,
executing a second animated effect to show a merging of the forecasting model feature with the first forecast version of the primary time series on the linear importance visualization graph,
replacing, using a third animated effect and after the forecasting model feature is overlapped with the first forecast version of the primary time series using the second animated effect, both the forecasting model feature and the first forecast version of the primary time series with the second forecast version of the primary time series on the linear importance visualization graph; and
displaying, based on the generating and to a user on a display of a computing device, the future forecast model.

2. The method of claim 1, wherein
generating the at least one forecasting model feature visualization output comprises generating the visual decomposition graph of time-based components making up the forecasting model feature,
the forecasting model feature is a time series, and generating the visual decomposition graph comprises:
dividing the forecasting model feature into the time-based components;
generating, using the time-based components, a mean time-based component;
overlaying the time-based components and the mean time-based component on top of one another on the visual decomposition graph; and
analyzing the time-based components on the visual decomposition graph to determine an area of the visual decomposition graph; and
applying, based on the determination of the area, a shading to the area of the visual decomposition graph.

3. The method of claim 2, wherein each of the time-based components covers a predetermined period within an entire period of the forecasting model feature.

4. The method of claim 3, wherein the time-based components comprise:
a first time-based component having a first predetermined period; and
a second time-based component having a second predetermined period different from the first predetermined period.

5. The method of claim 1, wherein
generating the at least one forecasting model feature visualization output comprises generating a short-term-long-term explainability chart, wherein the short-term-long-term explainability chart compares a long-term importance of the forecasting model feature with a corresponding short-term importance, and
generating the short-term-long-term explainability chart comprises:
analyzing an effect of the forecasting model feature on the future prediction over a first period of time to generate a short-term importance value;
analyzing an effect of the forecasting model feature on the future prediction over a second period of time longer than the first period of time to generate a long-term importance value; and
plotting the short-term importance value and the long-term importance value on the short-term-long-term explainability chart.

6. The method of claim 1, wherein
generating the at least one forecasting model feature visualization output comprises generating an outlier events visualization chart,
the forecasting model feature includes information corresponding to outlier events occurring within an entire period of the time series data set,
generating the outlier event visualization chart comprises:
generating:
a second future prediction using the forecasting model feature in the machine learning model; and
a third future prediction without using the forecasting model feature in the machine learning model, and
overlaying the second future prediction and the third future prediction on the outlier events visualization chart, and
marking, on the outlier events visualization chart, differences between the second future prediction and the third future prediction.

7. The method of claim 6, wherein
the method further comprises marking only differences exceeding a predetermined outlier threshold, and
the differences exceeding the predetermined outlier threshold illustrates a weight of the outlier events on the future prediction.

8. The method of claim 1, generating the linear importance visualization graph further comprises:
introducing, using the first animated effect, the second forecasting model feature onto the linear importance graph;
executing the second animated effect to show a merging of the second forecasting model feature with the second forecast version of the primary time series on the linear importance visualization graph; and
replacing, using the third animated effect and after the second forecasting model feature is overlapped with the second forecast version of the primary time series using the second animated effect, both the second forecasting model feature and second forecast version of the primary time series with the third forecast version of the primary time series on the linear importance visualization graph.

9. The method of claim 1, wherein the first forecast version is merged with the forecasting model feature using the second animated effect to visualize an effect of both the forecasting model feature and the second forecasting model on the primary time series.

10. A non-transitory computer readable medium (CRM) comprising computer readable program code, which when executed by a computer processor enables the computer processor to perform a method for visualizing time series models, the method comprising:
obtaining, by a visualization engine, a time series dataset, wherein the time series dataset comprises a plurality of forecasting model features;
receiving, in response to obtaining the time series data set, instructions to generate a future forecast model for the time series dataset, wherein the future forecast model comprises:
a future prediction of the times series dataset; and
at least one forecasting model feature visualization output illustrating an effect of at least one of the forecasting model features on the future prediction,
wherein the at least one forecasting model feature visualization output to be generated is based on a selection of a forecasting model feature from among the forecasting model features and an explainability type, and information of the selection is included in the instructions, wherein the explainability type notifies the visualization engine that the at least one forecasting model feature visualization output is a visual decomposition graph;
generating, based on the instructions and by applying the time series data to a machine learning model comprising a time series forecaster, the future forecast model, wherein the time series data further comprises a primary time series covering a period of time, and the future prediction is generated for the primary time series, wherein generating the at least one forecasting model feature visualization output comprises generating a linear importance visualization graph,
wherein generating the linear importance visualization graph comprises:
generating, using the machine learning model:
a first forecast version of the primary time series over the period of time without the forecasting model feature and a second forecasting model feature among the forecasting model features;

a second forecast version of the primary time series over the period of time using only the forecasting model feature;

a third forecast version of the primary time series over the period of time using both the forecasting model feature and the second forecasting model feature plotting the primary time series and the first forecast version of the primary time series on the linear importance visualization graph, introducing, using a first animated effect, the forecasting model feature onto the linear importance visualization graph, executing a second animated effect to show a merging of the forecasting model feature with the first forecast version of the primary time series on the linear importance visualization graph, replacing, using a third animated effect and after the forecasting model feature is overlapped with the first forecast version of the primary time series using the second animated effect, both the forecasting model feature and the first forecast version of the primary time series with the second forecast version of the primary time series on the linear importance visualization graph; and displaying, based on the generating and to a user on a display of a computing device, the future forecast model.

11. The CRM of claim 10, wherein
generating the at least one forecasting model feature visualization output comprises generating the visual decomposition graph of time-based components making up the forecasting model feature,
the forecasting model feature is a time series, and
generating the visual decomposition graph comprises:
dividing the forecasting model feature into the time-based components;
generating, using the time-based components, a mean time-based component;
overlaying the time-based components and the mean time-based component on top of one another on the visual decomposition graph; and
analyzing the time-based components on the visual decomposition graph to determine an area of the visual decomposition graph; and
applying, based on the determination of the area, a shading to the area of the visual decomposition graph.

12. The CRM of claim 11, wherein
generating the at least one forecasting model feature visualization output comprises generating a short-term-long-term explainability chart, wherein the short-term-long-term explainability chart compares a long-term importance of the forecasting model feature with a corresponding short-term importance, and
generating the short-term-long-term explainability chart comprises:
analyzing an effect of the forecasting model feature on the future prediction over a first period of time to generate a short-term importance value;
analyzing an effect of the forecasting model feature on the future prediction over a second period of time longer than the first period of time to generate a long-term importance value; and
plotting the short-term importance value and the long-term importance value on the short-term-long-term explainability chart.

13. The CRM of claim 11, wherein
generating the at least one forecasting model feature visualization output comprises generating an outlier events visualization chart,
the forecasting model feature includes information corresponding to outlier events occurring within an entire period of the time series data set,
generating the outlier event visualization chart comprises:
generating:
a second future prediction using the forecasting model feature in the machine learning model; and
a third future prediction without using the forecasting model feature in the machine learning model, and
overlaying the second future prediction and the third future prediction on the outlier events visualization chart, and
marking, on the outlier events visualization chart, differences between the second future prediction and the third future prediction.

14. A system comprising:
a memory storing a time series dataset comprising a plurality of time series models; and
a processor coupled to the memory, wherein the processor is configured to:
obtain, by a visualization engine, a time series dataset, wherein the time series dataset comprises a plurality of forecasting model features;
receive, in response to obtaining the time series data set, instructions to generate a future forecast model for the time series dataset, wherein the future forecast model comprises:
a future prediction of the times series dataset; and
at least one forecasting model feature visualization output illustrating an effect of at least one of the forecasting model features on the future prediction,
wherein the at least one forecasting model feature visualization output to be generated is based on a selection of a forecasting model feature from among the forecasting model features and an explainability type, and information of the selection is included in the instructions, wherein the explainability type notifies the visualization engine that the at least one forecasting model feature visualization output is a visual decomposition graph;
generate, based on the instructions and by applying the time series data to a machine learning model comprising a time series forecaster, the future forecast model, wherein the time series data further comprises a primary time series covering a period of time, and the future prediction is generated for the primary time series, wherein generating the at least one forecasting model feature visualization output comprises generating a linear importance visualization graph,
wherein generating the linear importance visualization graph comprises:
generating, using the machine learning model:
a first forecast version of the primary time series over the period of time without the forecasting model feature and a second forecasting model feature among the forecasting model features;
a second forecast version of the primary time series over the period of time using only the forecasting model feature;

a third forecast version of the primary time series over the period of time using both the forecasting model feature and the second forecasting model feature;

plotting the primary time series and the first forecast version of the primary time series on the linear importance visualization graph, introducing, using a first animated effect, the forecasting model feature onto the linear importance visualization graph, executing a second animated effect to show a merging of the forecasting model feature with the first forecast version of the primary time series on the linear importance visualization graph, replacing, using a third animated effect and after the forecasting model feature is overlapped with the first forecast version of the primary time series using the second animated effect, both the forecasting model feature and the first forecast version of the primary time series with the second forecast version of the primary time series on the linear importance visualization graph; and display, based on the generating and to a user on a display of a computing device, the future forecast model.

15. The system of claim 14, wherein
generating the at least one forecasting model feature visualization output comprises generating the visual decomposition graph of time-based components making up the forecasting model feature,
the forecasting model feature is a time series, and
generating the visual decomposition graph comprises:
dividing the forecasting model feature into the time-based components;
generating, using the time-based components, a mean time-based component;
overlaying the time-based components and the mean time-based component on top of one another on the visual decomposition graph; and
analyzing the time-based components on the visual decomposition graph to determine an area of the visual decomposition graph; and applying, based on the determination of the area, a shading to the area of the visual decomposition graph.

16. The system of claim 14, wherein
generating the at least one forecasting model feature visualization output comprises generating a short-term-long-term explainability chart, wherein the short-term-long-term explainability chart compares a long-term importance of the forecasting model feature with a corresponding short-term importance, and
generating the short-term-long-term explainability chart comprises:
analyzing an effect of the forecasting model feature on the future prediction over a first period of time to generate a short-term importance value;
analyzing an effect of the forecasting model feature on the future prediction over a second period of time longer than the first period of time to generate a long-term importance value; and
plotting the short-term importance value and the long-term importance value on the short-term-long-term explainability chart.

17. The system of claim 14, wherein
generating the at least one forecasting model feature visualization output comprises generating an outlier events visualization chart,
the forecasting model feature includes information corresponding to outlier events occurring within an entire period of the time series data set,
generating the outlier event visualization chart comprises:
generating:
a second future prediction using the forecasting model feature in the machine learning model; and
a third future prediction without using the forecasting model feature in the machine learning model, and
overlaying the second future prediction and the third future prediction on the outlier events visualization chart, and
marking, on the outlier events visualization chart, differences between the second future prediction and the third future prediction.

* * * * *